United States Patent [19]
Bird

[11] 3,838,898
[45] Oct. 1, 1974

[54] COMBINED GREASE SEAL-DIRT SHIELD
[75] Inventor: Melvyn R. Bird, Huron, Ohio
[73] Assignee: General Motors Corporation, Detroit, Mich.
[22] Filed: July 30, 1973
[21] Appl. No.: 384,142

[52] U.S. Cl. ............................................. 308/187.2
[51] Int. Cl. ........................................... F16c 33/78
[58] Field of Search ............... 308/187.1, 187.2, 277

[56] References Cited
UNITED STATES PATENTS
2,419,885   4/1947   Cooper ........................... 208/187.2

Primary Examiner—Manuel A. Antonakas
Assistant Examiner—Frank Susko
Attorney, Agent, or Firm—F. J. Fodale

[57] ABSTRACT

A combined grease seal-dirt shield for an antifriction bearing or the like comprises a unit-handled assembly which includes a scraper ring for cooperation with a land of the inner race ring to protect the grease seal from dirt and other deleterious matter. The scraper ring is radially floatable thus permitting a close running fit with the inner race land. The scraper ring is also flared and axially movable into an operative association with the grease seal to increase the lip sealing pressure responsive to dirt build-up between the scraper ring and the case.

8 Claims, 3 Drawing Figures

PATENTED OCT 1 1974 3,838,898

COMBINED GREASE SEAL-DIRT SHIELD

My invention relates generally to sealing means for an antifriction bearing or the like and more specifically to a combined grease seal-dirt shield arrangement.

Often, antifriction bearings in agricultural equipment and machinery for land cultivation are exposed in close proximity to the land being cultivated and thus are subjected to severe environmental conditions in that dirt accumulates and builds up on the exposed portions of the bearings and the portion of the equipment and machinery immediately adjacent the bearing. These agricultural applications impose severe requirements on the manner in which the bearing is sealed so that grease is retained in the bearing and dirt is kept out of the bearing.

In the past, such a requirement for agricultural bearing applications has been met by a unit-handled arrangement having a flexible, elastomeric grease seal element bonded to an insert nested securely in an outer sheet metal case. The case was mounted with a press fit in a bore formed by a land of the outer race and the outboard end wall of the case extended radially inwardly to a close proximity to a land on the inner race ring. This end wall side of the case formed a dirt shield to protect the grease seal element. However, due to manufacturing tolerances, eccentricities between the race ring during operation of the bearing and bearing run out, the radial clearance between the end wall of the case, and the inner race ring land was subject to practical limits which allowed some dirt to pass therebetween and reach the grease seal element. Consequently, a unitary, elastomeric grease seal element having a multi-lip arrangement was used.

I have also become aware of the prior art arrangement shown in the U.S. Pat. No. 2,990,220 issued June 27, 1961 to Joseph Malone for a "Bearing Retainer and Seal Structure For Tractor Track Roller" in which an attempt has been made to close the radial clearance between the relatively rotatable parts forming a dirt barrier for an agricultural bearing application. This solution, however, is unduly complicated as the arrangement comprises many pieces which are assembled to the device after the bearing is incorporated into the device.

Furthermore, the dirt shield portion of the arrangement is mounted in the device in such a way that the dirt shield rubs against its associated surface at the maximum diameter where the speeds are highest and produce the most wear. Furthermore, the dirt shield portion includes an expandable ring which necessarily has an undesirable circumferential gap permitting the passage of dirt, which is under compression increasing wear and which requires an expensive, precisely machined part to hold it.

It is an object of my invention to provide a combined grease seal-dirt shield arrangment which is simple and designed for inexpensive manufacture.

It is a further object of my invention to provide a combined grease seal-dirt shield arrangement which is a unit-handled assembly which may be mounted on a bearing by a simple press fit and in which the metal part may be inexpensively made from stamped sheet metal.

It is another object of my invention to provide a combined grease seal-dirt shield arrangement in which the grease seal is protected by a scraper ring which completely surrounds a cooperating surface on the inner race ring member with a close running fit without any circumferential gaps.

A feature of my invention is that it may easily incorporate a second means for preventing larger particles of dirt from reaching a scraper ring thus providing a double protection for the grease seal.

Another feature of my invention is that the outer case and scraper element may be designed so as to increase the pressure of the sealing lip of the grease seal responsive to a dirt build-up in the case.

Another feature of my invention is that a grease seal having a single flexible grease sealing lip may be used in some less severe applications when an initial dirt seal is incorporated in addition to the scraper ring.

Other objects and features of the invention will become apparent to those skilled in the art as the disclosure is made in the following detailed description of a preferred embodiment of the invention as illustrated in the accompanying sheet of drawings in which.

Figure 1:
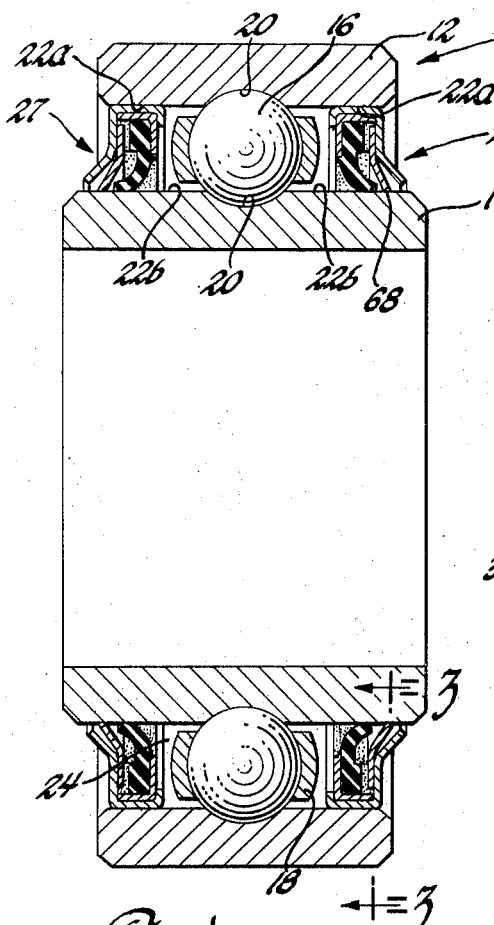
FIG. 1 is an axial section of an antifriction bearing having a combined grease seal-dirt shield in accordance with my invention at each end of the bearing.

Referring now to the drawings and more particularly to FIG. 1, an antifriction bearing indicated generally at 10 comprises an outer race ring 12 and an inner race ring 14 radially spaced for relative rotation by a complement of balls 16 circumferentially spaced by a separator 18. The balls run in full groove raceways 20 machined in the race rings 12 and 14 leaving cylindrical lands 22a and 22b on each side of the raceway in the inner and outer race rings respectively.

The annular space between the race rings 12 and 14 may be closed at both ends to form a chamber 24 which when grease filled provides a lubricated-for-life bearing. My invention concerns a combined grease seal-dirt shield for retaining grease or other lubricant in the chamber 24 and for preventing the ingress of dirt and other deleterious matter when the bearing operates in a particularly harsh environment, such as is encountered by antifriction bearings used on agricultural machinery for cultivating farm land. In the particular bearing 10 illustrated for purposes of disclosure, a combined grease seal-dirt shield in accordance with my invention is used on each side of the bearing as indicated generally at 25 and 27. Since the combined grease seal-dirt shield 25 and 27 are identical, a detailed description of the right hand combined grease seal-dirt shield 25 will suffice.

Figure 2:
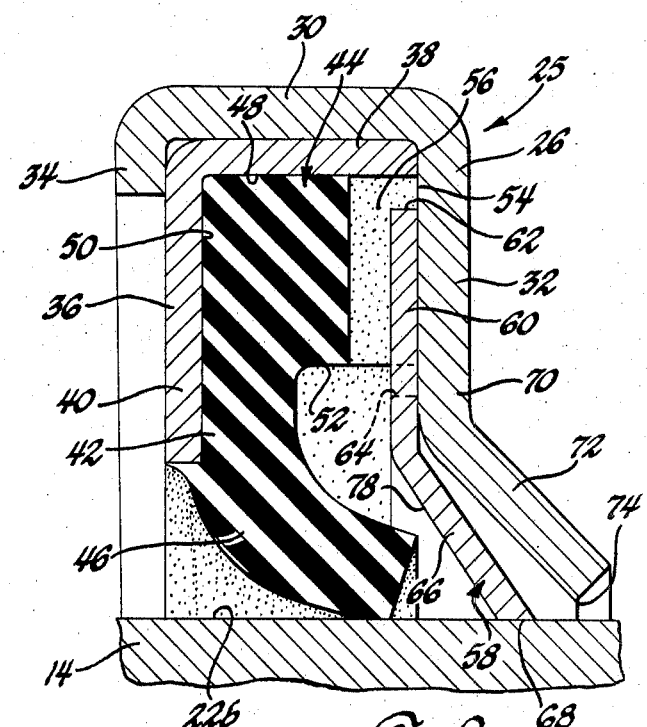
FIG. 2 is an enlargement of an axial section of the combined grease seal-dirt shield shown at the right end of the bearing in FIG. 1.
Figure 3:
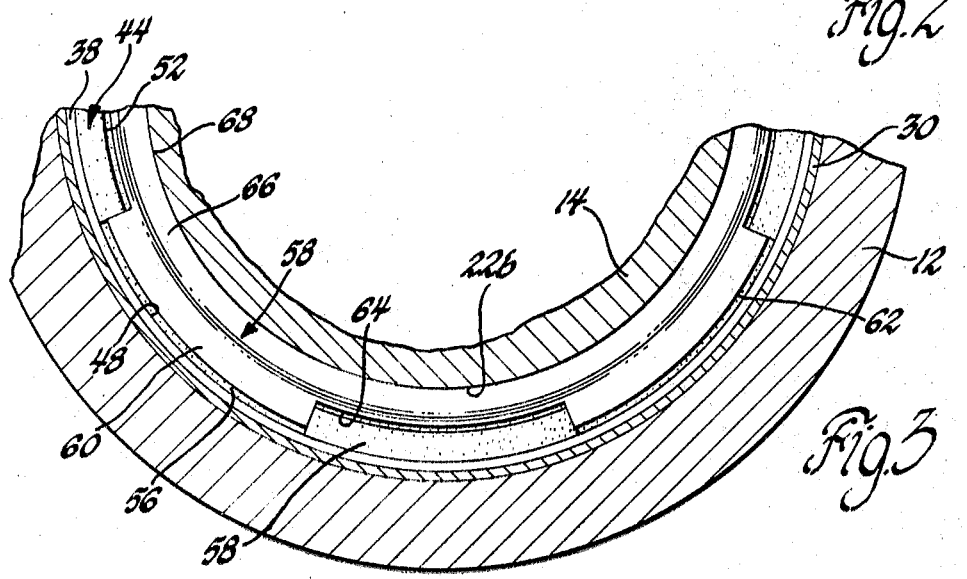
FIG. 3 is a section view taken along the line 3—3 of FIG. 1.

Referring now to both FIGS. 1 and 2, the combined grease seal-dirt shield 25 is a unit-handled subassembly held together by an annular case 26 having a cylindrical wall 30 with a generally radial, inwardly extending end wall 32 contiguous with one end thereof and a short crimped-over flange 34 contiguous with the opposite end thereof. Nested within the case 26 is an L-shaped insert 36 comprising a rim 38 and a flange 40 to which is bonded an elastomeric grease seal 42. More specifically, the grease seal 42 has an enlarged body portion 44 which is coextensive with the insert rim 38 and a thinner, annular lip 46 depending from the left hand portion of the body 44. The grease seal 42 may be molded directly to the insert 36 or otherwise suitably bonded to the faces 48 and 50 of the insert. The insert flange 40 may extend radially inwardly of the body 44 and thus a portion of the sealing lip 46 may be bonded to the face 50 and inner end surface of the insert flange 40 so long as the sealing lip 46 includes a flexible portion which can resiliently deform into a lightly biased sealing engagement with the land 22b as shown in FIGS. 1 and 2. The insert rim 38 with the grease seal 42 bonded thereto is nested within the case 26 and non-rotatably secured thereto by the case flange 34 which is crimped-over the insert flange 40 with sufficient force to prevent relative rotation between the insert and the case.

The face 54 of the seal body 44 which abuts the case end wall 32 has a number of circumferentially spaced radial slots 56 opening into the inner circumferential surface 52 and extending to the insert rim 38. Disposed between the seal lip 46 and the case wall 32 is a scraper ring 58 which has a corresponding number of radial outwardly extending fingers 60 which are individually received in the slots 56. The ends 62 of the fingers 60 terminate short of the insert rim 38 at the outer ends of the slots 56 and the outer margin 64 of the scraper ring 58 joined to the roots of the fingers 60 is spaced radially inwardly of the inner circumferential surface 52 of the seal body 44 to allow radial adjustment of the scraper ring 58.

The inner marginal portion 66 of the scraper ring 58 is preferably flared away from the sealing lip 46 and terminates in a substantially cylindrical surface 68. The end wall 32 of the outer case 30 is preferably shaped with a flat perpendicular outer portion 70 which extends radially inwardly of the outer margin 64 of the scraper ring 58 by a significant amount. The end wall 32 then continues into an inner flared portion 72 angled in the same general direction as the flared portion 66 of the scraper ring and terminating in an edge 74. Preferably the angle of the flared portion 72 of the case end wall 32 is steeper than that of the flared portion 66 of the scraper ring so that the space therebetween decreases in width in the radially outward direction.

The grease seal-dirt shield 25 is sized such that the stamped sheet metal case 26 has a slight interference fit with the land 22a of the outer race ring 12. This press fit nonrotatably secures the combined grease seal-dirt shield to the outer bearing ring 12. The inner edge 74 is sized to extend into close proximity to the land 22b on the inner race ring 14 taking into account the normal range of eccentricities and run out in the antifriction bearing 10 which in the case of the fabrication techniques used today, can normally be held to a nominal clearance of about 0.015 inch. The cylindrical surface 68 of the scraper ring 58 however is sized with a close running fit with the land 22b. By close running fit, I mean that the nominal clearance between the surface 68 and the land 22b is approximately one thousandths of an inch. This close running fit is of a much higher degree than can be used with a fixed part of the case such as the edge 74 on the wall 32 and is possible because the scraper ring 58 floats radially within the case 26. As indicated above, in its preferred form, the end wall 32 has the flat perpendicular outer portion 70 on the end wall 32 which extends radially inwardly of the outer margin 64 of the scraper ring by a significant amount. By significant amount, I mean that even under the most adverse condition when the cylindrical surface 64 of the scraper ring 58 and the edge 74 of the end wall 32 are tangentially aligned such as by simultaneously contacting the inner land 22a. Under this condition the flat portion 70 still overlaps the outer margin 64 of the scraper ring. This feature inhibits the entry on dirt into the grease seal area through the space between the fingers 60.

Another preferred feature of the combined grease seal-dirt shield arrangement is that of the particular flare used so that the space decreases in width in the radial outward direction. As is evident from FIG. 2, the edge 74 excludes larger particles of dirt from reaching the scraper ring 58. However, the smaller particles of dirt passing the edge 74 build-up in the space between the flared sections 68 and 72. The dirt build-up in this wedge-shaped space tends to move the scraper ring 58 toward the left until the surface 78 on the flared portion 66 of the scraper ring 58 engages the free edge portion of the sealing lip 46. Any continued dirt build-up further biases the sealing edge portion of the sealing lip 46 into tighter sealing engagement with the land 22b thus safeguarding the bearing against ingress of dirt even after excessive dirt build-up.

I wish it to be understood that I do not desire to be limited to the exact details of construction shows and described, for obvious modifications will occur to a person skilled in the art.

What is claimed is:

1. A combined grease seal-dirt shield for an antifriction bearing having relatively rotatable inner and outer race rings radially spaced by antifriction elements disposed therebetween comprising, an annular case having a cylindrical wall adapted to engage a land of an outer race ring with a press fit and a generally radial inwardly extending end wall contiguous with an end of said cylindrical wall, an annular L-shaped insert having a flange and a rim secured in a nesting relationship in said outer annular case with said rim engaging a surface of said end wall and spacing said flange from said end wall of said annular case, an elastomeric grease seal having a body disposed between said flange and said end wall and a thinner, depending annular flexible lip adapted to sealingly engage a land of an inner race ring.

said body portion having an outer peripheral surface bonded to an inner face of said rim, a first end surface bonded to a face of said flange contiguous with said inner face, and a second end face abutting said surface of said end wall, said body having a plurality of radial slots in said second end face extending from an inner circumferential surface of said body, and a scraper ring having an inner circumferential surface adapted to encircle and engage a land of an inner ring with a close running fit, said scraper ring having a plurality of radial, outwardly extending fingers disposed in said radial slots, said fingers having free ends and root ends spaced radially inwardly of the outer ends of said slots and said inner circumferential surface of said body respectively when said scraper ring is concentric with said body whereby said scraper ring is substantially non-rotatable with respect to said case while being radially adjustable with respect to said case to compensate for eccentricities and run out between an outer race ring land of an antifriction bearing on which said case is mounted and an inner race ring land of said antifriction bearing which said inner circumferential surface of said scraper ring engages.

2. A combined grease seal-dirt shield as defined in claim 1 wherein said scraper ring has a flared inner marginal portion angled away from said lip of said grease seal and wherein said inner circumferential surface of said scraper ring which is adapted to encircle and engage a land of an inner race ring with a close running fit is a cylindrical surface of said inner marginal portion.

3. A combined grease seal-dirt shield as defined in claim 2 wherein said end wall of said annular case terminates with an inner peripheral surface having a diameter slightly larger than the diameter of said inner circumferential surface of said scraper ring whereby said end wall is adapted to cooperate with a land of an inner race ring to prevent larger particles of dirt traveling along the land from reaching said scraper ring.

4. A combined grease seal-dirt shield as defined in claim 3 wherein said end wall of said annular case has a flat portion contiguous with said cylindrical wall which extends radially inwardly of the root ends of said fingers on said scraper ring sufficiently to overlap said root ends when said scraper ring is eccentrically located with respect to said end wall up to an amount limited by said inner peripheral surface of said end wall and said cylindrical surface of said scraper ring being tangentially aligned.

5. A combined grease seal-dirt shield as defined in claim 4 wherein said end wall of said annular case has a flared inner marginal portion angled away from said scraper ring and forming a wedge-shaped space with said flared inner marginal portion of said scraper ring which decreases in width in the radially outward direction.

6. In an antifriction bearing or the like having relatively rotatable inner and outer race rings radially spaced by antifriction elements disposed therebetween, a combined grease seal-dirt shield comprising, an outer annular case having a cylindrical wall adapted to engage a land of said outer race ring with a press fit and a generally radial inwardly extending end wall contiguous with an end of said cylindrical wall, said end wall having an inner circumferential edge encircling and lying in close proximity to a land of said inner race ring, an annular L-shaped insert having a flange and a rim secured in a nesting relationship in said annular case with said rim engaging a surface of said end wall and spacing said flange from said end wall of said outer annular case, an elastomeric grease seal having a body disposed between said flange and said end wall and a thinner, depending annular flexible lip in a lightly biased sealing engagement with said land of said inner race ring, said body portion having an outer peripheral surface bonded to an inner face of said rim of said insert along its entire length, a first end surface bonded to a face of said flange contiguous with said inner face, and a second end face abutting said surface of said end wall, said body having a plurality of radial slots in said second end face extending radially completely through said body from an inner circumferential surface thereof to said outer peripheral surface, and a scraper ring having a flared inner marginal portion terminating in an inner cylindrical surface having a diameter less than the diameter of said edge of said case end wall, said cylindrical surface encircling and engaging said land of said inner race ring with a close running fit, said scraper ring having a plurality of radial, outwardly extending fingers disposed in said radial slots, said fingers having free ends and root ends spaced radially inwardly of the outer ends of said slots and said inner circumferential surface of said body respectively when said annular scraper ring is concentric with said body whereby said scraper ring is substantially non-rotatable with respect to said outer race ring and radially adjustable with respect thereto to compensate for eccentricities and run out between said race rings during operation of said anitfriction bearing.

7. In an antifriction bearing or the like having relatively rotatable inner and outer race rings radially spaced by antifriction elements disposed therebetween, a combined grease seal-dirt shield as defined in claim 6 wherein said end wall of said annular case has a flat portion contiguous with said cylindrical wall which extends radially inwardly of the root ends of said fingers on said scraper ring sufficiently to overlap said root ends when said scraper ring is eccentrically located with respect to said end wall up to an amount limited by said inner peripheral surface of said end wall and said cylindrical surface of said scraper ring being tangentially aligned.

8. A combined grease seal-dirt shield as defined in claim 7 wherein said end wall of said annular case has a flared inner marginal portion angled away from said scraper ring and forming a wedge-shaped space with said flared inner marginal portion of said scraper ring which decreases in width in the radially outward direction and wherein said scraper ring is axially movable into operative relationship with said annular flexible lip to increase the sealing engagement with said land of said inner race ring responsive to dirt build-up in said wedge-shaped space.

* * * * *